United States Patent
Son et al.

(10) Patent No.: US 10,608,252 B2
(45) Date of Patent: Mar. 31, 2020

(54) LITHIUM SECONDARY BATTERY COMPRISING POSITIVE ELECTRODE ACTIVE MATERIAL FOR SYNTHESIS OF LITHIUM COBALT OXIDE AND PREPARATION METHOD THEREOF

(71) Applicant: LG CHEM, LTD., Seoul (KR)

(72) Inventors: Byoungkuk Son, Daejeon (KR); Minchul Jang, Daejeon (KR); Junghun Choi, Daejeon (KR); Da Young Sung, Daejeon (KR); Se Ho Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 76 days.

(21) Appl. No.: 15/740,614

(22) PCT Filed: Jun. 12, 2017

(86) PCT No.: PCT/KR2017/006076
§ 371 (c)(1),
(2) Date: Dec. 28, 2017

(87) PCT Pub. No.: WO2018/016737
PCT Pub. Date: Jan. 25, 2018

(65) Prior Publication Data
US 2018/0323430 A1    Nov. 8, 2018

(30) Foreign Application Priority Data

Jul. 21, 2016 (KR) .......... 10-2016-0092453

(51) Int. Cl.
*H01M 4/525* (2010.01)
*H01M 10/0525* (2010.01)
(Continued)

(52) U.S. Cl.
CPC ......... *H01M 4/525* (2013.01); *H01M 4/0445* (2013.01); *H01M 4/0447* (2013.01);
(Continued)

(58) Field of Classification Search
None
See application file for complete search history.

(56) References Cited

U.S. PATENT DOCUMENTS 6,994,933 B1 * 2/2006 Bates .................. H01M 2/0207
429/124
8,182,943 B2 * 5/2012 Visco .................... H01B 1/122
429/104

(Continued)

FOREIGN PATENT DOCUMENTS

CN    1207801 C    6/2005
CN    1215587 C    8/2005
(Continued)

OTHER PUBLICATIONS

Verelst et al., Synthesis and Characterization of CoO, Co3O4, and Mixed Co/CoO Nanoparticules. Chem. Mater. 1999, 11, 2702-2708. (Year: 1999).*

(Continued)

*Primary Examiner* — Jonathan G Leong
*Assistant Examiner* — Kirsten B Tysl
(74) *Attorney, Agent, or Firm* — Birch, Stewart, Kolasch & Birch, LLP

(57) ABSTRACT

The present invention relates to a lithium secondary battery, more particularly, to a lithium secondary battery in which a low-cost positive electrode active material is applied and a negative electrode active material of lithium metal is formed on the positive electrode side, and to a preparation method thereof. The lithium secondary battery according to the present invention can be produced at a low unit cost of (Continued)

production because it employs a complex combined from relatively inexpensive Co, CoO, $Co_3O_4$ and $Li_2O$, instead of $LiCoO_2$ which is a common positive electrode active material, and the lithium secondary battery is also easy to mass produce because of its simple manufacturing process since $LiCoO_2$ is synthesized through an electrochemical reaction due to operating of the battery without a separate heat treatment process.

11 Claims, 2 Drawing Sheets

(51) Int. Cl.
  *H01M 4/48* (2010.01)
  *H01M 4/04* (2006.01)
  *H01M 4/62* (2006.01)
  *H01M 4/36* (2006.01)
  *H01M 4/38* (2006.01)
  *H01M 4/52* (2010.01)
  *H01M 10/058* (2010.01)

(52) U.S. Cl.
  CPC ............ *H01M 4/364* (2013.01); *H01M 4/366* (2013.01); *H01M 4/38* (2013.01); *H01M 4/483* (2013.01); *H01M 4/523* (2013.01); *H01M 4/62* (2013.01); *H01M 10/058* (2013.01); *H01M 10/0525* (2013.01); *H01M 4/382* (2013.01)

(56) References Cited

U.S. PATENT DOCUMENTS

| | | |
|---|---|---|
| 2001/0054555 A1 | 12/2001 | Yoshimura et al. |
| 2002/0018935 A1 | 2/2002 | Okada |
| 2004/0091781 A1 | 5/2004 | Nakai et al. |
| 2005/0244715 A1 | 11/2005 | Cho et al. |
| 2014/0294720 A1 | 10/2014 | Noguchi et al. |
| 2015/0052739 A1 | 2/2015 | Deb |
| 2015/0228976 A1 | 8/2015 | Kim et al. |
| 2016/0049655 A1* | 2/2016 | Fasching ............... H01M 4/582 429/221 |
| 2017/0133660 A1 | 5/2017 | Kurihara et al. |
| 2017/0317342 A1 | 11/2017 | Kang et al. |
| 2018/0190976 A1* | 7/2018 | Blangero ............... C01G 51/42 |

FOREIGN PATENT DOCUMENTS

| | | |
|---|---|---|
| JP | 3267667 B2 | 3/2002 |
| JP | 2002-237293 A | 8/2002 |
| JP | 3353066 B2 | 12/2002 |
| JP | 2011-124126 A | 6/2011 |
| JP | 2015-79706 A | 4/2015 |
| JP | 2015-141949 A | 8/2015 |
| JP | 2015-159098 A | 9/2015 |
| KR | 10-0269884 B1 | 10/2000 |
| KR | 10-2005-0093535 A | 9/2005 |
| KR | 10-0590096 B1 | 6/2006 |
| KR | 10-2014-0118728 A | 10/2014 |
| KR | 10-2014-0132830 A | 11/2014 |
| KR | 10-2015-0095128 A | 8/2015 |
| KR | 10-2016-0030784 A | 3/2016 |
| KR | 10-2016-0040118 A | 4/2016 |
| KR | 10-2016-0138120 A | 12/2016 |
| WO | WO 2014/065067 A1 | 5/2014 |

OTHER PUBLICATIONS

European Search Report for Appl. No. 17825718.4 dated May 15, 2019.

* cited by examiner

[Figure 1]
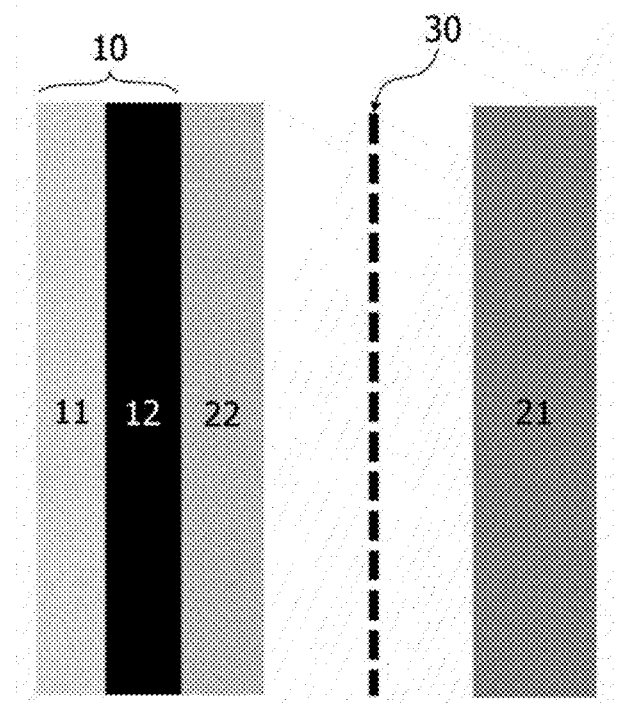
[Figure 2]
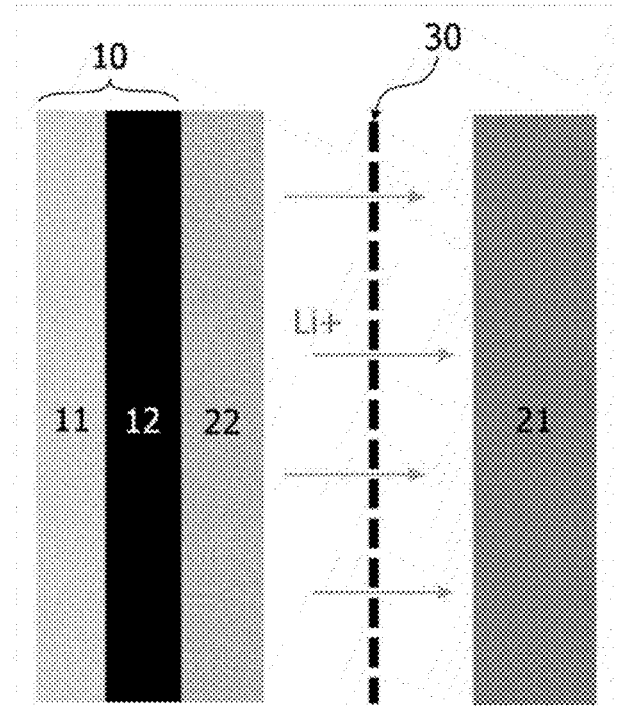

[Figure 3]
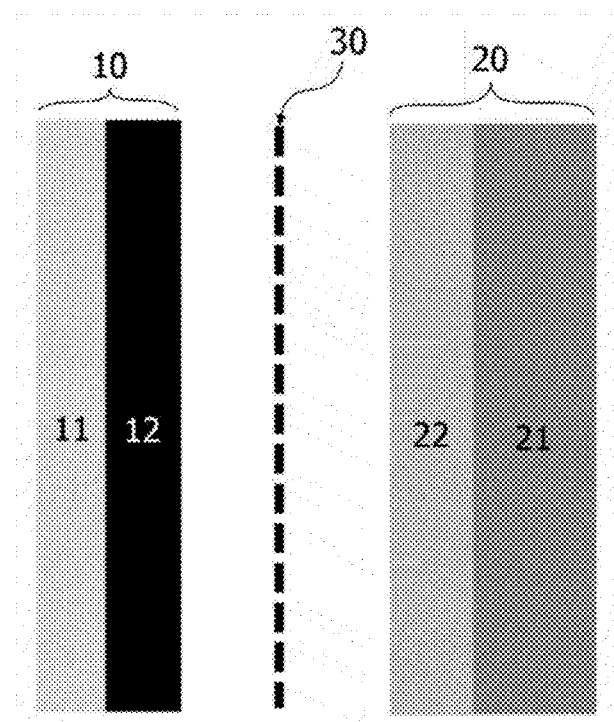

LITHIUM SECONDARY BATTERY COMPRISING POSITIVE ELECTRODE ACTIVE MATERIAL FOR SYNTHESIS OF LITHIUM COBALT OXIDE AND PREPARATION METHOD THEREOF

TECHNICAL FIELD

The present application claims the benefit of priority based on Korean Patent Application No. 10-2016-0092453, filed on Jul. 21, 2016, the entire contents of which are incorporated herein by reference in its entirety.

The present invention relates to a lithium secondary battery, and more particularly, to a lithium secondary battery in which a low-cost positive electrode active material is applied and a negative electrode active material of lithium metal is formed on the positive electrode side, and to a preparation method thereof.

BACKGROUND ART

Recently, various devices that require batteries, such as cellular phones, wireless home appliances, and electric vehicles, are being developed. As these devices are developed, the demand for secondary batteries is also increasing. Particularly, along with the tendency of miniaturization of electronic products, secondary batteries are also becoming lighter and smaller.

In accordance with this trend, lithium secondary batteries, which use lithium metal as active material, are attracting attention. Lithium metal has a low redox potential (−3.045 V vs. standard hydrogen electrode) and a high weight energy density (3,860 $mAhg^{-1}$), and thus is expected to be a negative electrode material for high capacity secondary batteries.

The metal chalcogenide compound capable of intercalating and deintercalating lithium ions has been used as a positive electrode active material for this lithium secondary battery since the 1970s. However, due to the low operating voltage, composite metal oxides such as $LiCoO_2$, $LiMn_2O_4$, $LiNiO_2$, $LiNi_{1-y}Co_yO_2$ (0<y<1), and $LiMnO_2$ have been replaced and put to practical use or studied.

In particular, $LiCoO_2$ was reported to be useful as a positive electrode active material for lithium secondary batteries in 1980, and thereafter has been extensively studied so far and has been adopted as a positive electrode active material for commercial lithium secondary batteries. However, in a situation where the unit cost of preparation of $LiCoO_2$ accounts for a substantial portion (about 25%) of the unit cost of preparation of the battery, and due to the increasingly accelerating competition in the field of lithium secondary batteries, makers of lithium secondary batteries are forced to do their best to further lower production costs.

The high unit cost of $LiCoO_2$ is attributed to the following two reasons. First, the high unit cost of preparation of cobalt raw material is one of the reasons. Second, the costs for quality control and process control at mass manufacturing scale are another reason. Particularly, in terms of quality control and process control, makers of batteries aim to obtain highly reproducible products with optimized physical properties wherein all batches aim to have little variation from the above optimized performance. $LiCoO_2$ with its high reproducibility and very small fluctuation of performance is an essential element in the production line for the mass production scale of lithium batteries, which is now considerably automated.

PRIOR ART LITERATURE

Patent Literature

Japanese Patent Application Laid-Open No. 2015-159098, "Active Material".

DISCLOSURE

Technical Problem

As described above, $LiCoO_2$, which is mainly used as a positive electrode active material for the lithium secondary battery, has a disadvantage of a high unit cost of preparation. Therefore, as a result of various studies, the present inventors have found a method for synthesizing $LiCoO_2$ by an electrochemical reaction due to initial charging of the battery without a separate synthesis process using an inexpensive precursor material and have completed the present invention.

Accordingly, an object of the present invention is to provide a lithium secondary battery with improved battery performance, even while applying a less expensive positive electrode active material.

Technical Solution

In order to achieve the above object, the present invention provides a lithium secondary battery comprising a positive electrode including a positive electrode current collector and a positive electrode material mixture; a negative electrode comprising a negative electrode current collector and a negative electrode material mixture; a separator interposed therebetween; and electrolyte, wherein the positive electrode material mixture comprises a complex combined from Co, CoO, $Co_3O_4$ and $Li_2O$ as a positive electrode active material, and the negative electrode material mixture comprises lithium metal that is separated from the negative electrode current collector and positioned between the positive electrode material mixture and the separator, wherein a thin film of lithium is formed on one side of the positive electrode material mixture. At this time, a polymer protective layer may be formed on one side of the negative electrode current collector facing the separator.

In addition, the present invention provides a preparation method of a lithium secondary battery comprising forming a positive electrode material mixture on a positive electrode current collector; forming a thin film of lithium on the positive electrode material mixture; sequentially arranging and then laminating a separator and a negative electrode current collector on the thin film of lithium; and injecting electrolyte, wherein the positive electrode material mixture comprises a complex combined from Co, CoO, $Co_3O_4$ and $Li_2O$ as a positive electrode active material.

Advantageous Effects

The lithium secondary battery according to the present invention can be produced at a low unit cost of production because it employs a complex combined from relatively inexpensive Co, CoO, $Co_3O_4$ and $Li_2O$, instead of $LiCoO_2$ which is a common positive electrode active material, and the lithium secondary battery is also easy to mass produce because of its simple manufacturing process since $LiCoO_2$ is synthesized through an electrochemical reaction due to initial charging of the battery without a separate heat treatment process.

In addition, the lithium secondary battery according to the present invention can suppress the formation of the surface oxide film of lithium metal due to oxygen and moisture in the atmosphere, thereby consequently improving the cycle life characteristics, since the thin film of lithium is coated in a state of being shielded from the atmosphere through the process of forming the thin film of lithium on the negative electrode current collector.

DESCRIPTION OF DRAWINGS

FIG. 1 is a schematic diagram of the lithium secondary battery prepared according to the present invention.

FIG. 2 is a schematic diagram showing the migration of lithium ion ($Li^+$) at the time of initial charging of the lithium secondary battery prepared according to the present invention.

FIG. 3 is a schematic diagram of the lithium secondary battery prepared according to the present invention after the initial charging of the lithium secondary battery is completed.

BEST MODE

Hereinafter, the present invention will be described in detail with reference to the accompanying drawings so that those skilled in the art can easily carry out the present invention. However, the present invention may be embodied in many different forms and is not limited to the description set forth herein.

In the drawings, in order to clearly illustrate the present invention, parts that are not related to the description of the present invention are omitted, and similar reference numerals are used for similar parts throughout the specification. Also, the size and relative size of the components shown in the figures are independent of the actual scale and may be reduced or exaggerated for clarity of description.

FIG. 1 is a schematic diagram of the lithium secondary battery prepared according to the present invention. The present invention discloses a lithium secondary battery comprising a positive electrode 10 including a positive electrode current collector 11 and a positive electrode material mixture 12; a negative electrode 20 comprising a negative electrode current collector 21 and a negative electrode material mixture 22; a separator 30 interposed therebetween; and electrolyte (not shown), characterized in that the positive electrode material mixture 12 comprises a complex combined from Co, CoO, $Co_3O_4$ and $Li_2O$ as a positive electrode active material, and the negative electrode material mixture 22 comprises lithium metal that is separated from the negative electrode current collector 21 and positioned between the positive electrode material mixture 12 and the separator 30 wherein a thin film 22 of lithium is formed on one side of the positive electrode material mixture 12.

The positive electrode material mixture 12 according to the present invention can be produced in the form of a positive electrode by applying a composition including a positive electrode active material, a conductive material and a binder to a positive electrode current collector.

The complex combined from Co, CoO, $Co_3O_4$, and $Li_2O$ which is the positive electrode active material can be synthesized as $LiCoO_2$ at the time of initial charging of the lithium secondary battery without performing the separate heat treatment reaction. Generally, in order to synthesize $LiCoO_2$, the reaction should be carried out at a high temperature, but in the present invention, even if the initial charging is carried out at a low temperature of about 50 to 70° C., synthesis can be performed by supplementing the insufficient energy with electrochemical energy.

The complex combined from Co, CoO, $Co_3O_4$, and $Li_2O$ which is positive electrode active material contained in the positive electrode material mixture 12 may be a nano composite in which Co, CoO, $Co_3O_4$, and $Li_2O$ are mixed in a molar ratio of 3.8 to 4.2:4.8 to 5.2:0.8 to 1.2:5.8 to 6.2 of Co:CoO:$Co_3O_4$:$Li_2O$, and more preferably a combination in which Co, CoO, $Co_3O_4$, and $Li_2O$ are mixed in a molar ratio of 4:5:1:6. Combinations that are out of the range of the molar content may cause unreacted materials, thereby adversely affecting the performance of the battery.

Also, the positive electrode active material complex may be aggregates of the fine powders of Co, CoO, $Co_3O_4$, and $Li_2O$ wherein the aggregates may have structures having internal voids. This agglomerated particle structure can promote the synthesis of $LiCoO_2$ as the final structure by maximizing its surface area reacted with the electrolyte solution. The particle size of the fine powders is preferably 5 to 1000 nm, and the particle size of the aggregates is preferably 0.1 to 30 μm. This particle size distribution allows the reaction to occur efficiently.

The conductive material is a component for further improving the conductivity of the positive electrode active material, and as non-limiting examples, includes graphite such as natural graphite or artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powders; conductive whiskers such as zinc oxide and potassium titanate; conductive metal oxides such as titanium oxide; and conductive materials such as polyphenylene derivatives.

The binder has a function of holding the positive electrode active material on the positive electrode current collector and organically connecting positive electrode active materials to each other, and may include, for example, polyvinylidene fluoride (PVDF), polyvinyl alcohol (PVA), carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene-butadiene rubber, fluorine rubber, and various copolymers thereof, etc.

The positive electrode current collector 11 is not particularly limited as long as it has high conductivity without causing a chemical change in the battery, and may be at least one metal selected from the group consisting of copper, aluminum, stainless steel, zinc, titanium, silver, palladium, nickel, iron, chromium, alloys thereof and combinations thereof. The stainless steel may be surface-treated with carbon, nickel, titanium or silver, and the alloy may be an aluminum-cadmium alloy. In addition, baked carbon, a surface-treated non-conductive polymer with a conductive material, a conductive polymer, or the like may be used. In general, aluminum foil is used as the positive electrode current collector.

The positive electrode current collector 11 may be generally formed at a thickness of 3 to 500 μm, and may be formed in various forms such as film, sheet, foil, net, porous body, foam or nonwoven fabric.

A negative electrode material mixture 22 is placed on one side of the positive electrode material mixture 12 of the prepared positive electrode 10. The negative electrode material mixture 22 according to the present invention is preferably lithium metal, and the lithium metal is preferably formed in the form of a thin film on the positive electrode material mixture 12. The method of forming the thin film is not particularly limited as long as it is a laminating or depositing process, and includes, for example, but not limited to, various deposition methods such as electron beam deposition, metalorganic chemical vapor deposition, reactive sputtering, high frequency sputtering, and magnetron sputtering. Since each of the above-exemplified deposition methods is a known method, a detailed description thereof will be omitted in this specification.

The width of the thin film of lithium formed on one side of the positive electrode material mixture 12 can be controlled according to the shape of the electrode to facilitate the production of the electrode, and specifically, the thickness of the film is preferably 1 to 100 μm. If the thickness is less than 1 μm, it is difficult to satisfy the cycle characteristics due to insufficient efficiency of lithium, and if it exceeds 100 μm, there is a problem of energy density reduction due to an increase in lithium thickness.

In the lithium secondary battery prepared according to the present invention, it is possible to deposit the lithium located on the positive electrode material mixture 12 onto the negative electrode current collector 21 in the lithium secondary battery forming a thin film 22 of lithium on one side of the positive electrode material mixture 12 by initial charging. The thin film 22 of lithium is laminated by causing the lithium metal to migrate in the direction of the negative electrode through the electrolyte in the state of lithium ion ($Li^+$) and precipitate as lithium metal on the negative electrode current collector 21. Also, in the case of the lithium secondary battery with a polymer protective layer, lithium metal is laminated between the negative electrode current collector and the polymer protective layer at the time of initial charging.

FIG. 2 is a schematic diagram showing the migration of lithium ion ($Li^+$) at the time of initial charging of the lithium secondary battery prepared according to the present invention. FIG. 3 is a schematic diagram of the lithium secondary battery prepared according to the present invention after the initial charging of the lithium secondary battery is completed. Referring to FIGS. 2 and 3, in the case of the present invention, the lithium metal 22 applied as a negative electrode active material for the lithium secondary battery is formed on one side of the positive electrode material mixture 12 rather than the negative electrode current collector 21 in order to prepare the battery, and thereafter, lithium ions migrate to the side of negative electrode by initial charging at the time of battery operation and the thin film 22 of lithium is formed on the negative electrode current collector 21.

In the lithium secondary battery according to the present invention, the thin film 22 of lithium is coated in a state of being shielded from the atmosphere throughout the process of forming it on the negative electrode current collector 21, and thus the formation of the surface oxide film on lithium metal due to atmospheric oxygen and moisture can be suppressed, thereby resulting in improved cycle life characteristics.

At this case, the initial charging is preferably performed at a current density of 0.01 to 0.5 C because the shape of the lithium metal formed on the negative electrode varies depending on the current density at the time of initial charging.

At this time, in order for the fine particles of Co, CoO, $Co_3O_4$ and $Li_2O$ to be synthesized into $LiCoO_2$, the initial charging can proceed at a relatively low temperature of about 50 to 70° C., and the insufficient energy required for synthesis can be supplemented by the electrochemical energy due to voltage and current.

A polymer protective layer (not shown) may be formed on one side of the negative electrode current collector 21 facing the separator 30. In this case, when the initial charging is performed, the thin film 22 of lithium is formed between the polymer protective layer and the negative electrode current collector 21. The polymer protective layer suppresses side reactions between lithium formed on the negative electrode current collector 21 and electrolyte, and further plays a role in blocking the growth of dendrites.

The polymer protective layer is not limited as long as it is a lithium ion conductive polymer having lithium ion conductivity and may include, for example, but not limited to, any one selected from the group consisting of polyethylene oxide (PEO), polyacrylonitrile (PAN), polymethylmethacrylate (PMMA), polyvinylidene fluoride (PVDF), polyvinylidene fluoride-hexafluoropropylene (PVDF-HFP), LiPON, $Li_3N$, $Li_xLa_{1-x}TiO_3$ (0<x<1) and $Li_2S$—GeS—$Ga_2S_3$ or a mixture of two or more thereof.

The lower the thickness of the polymer protective layer, the better the output characteristics of the battery. However, the effect by the above-described polymer protective layer can be secured only if it is formed to a thickness exceeding a certain thickness. In the present invention, the thickness of the protective film may be preferably 0.01 to 50 μm. When the thickness of the protective layer is less than 0.01 μm, side reaction and exothermic reaction of the lithium and the electrolyte solution, which are increased under conditions such as overcharging or high-temperature storage, cannot be effectively suppressed and thus the safety improvement cannot be achieved. Also, when the thickness exceeds 50 μm, a long time is required for the polymer matrix in the protective layer to be impregnated or swelled by the electrolyte solution, and thus the migration of lithium ions may be deteriorated, thereby deteriorating overall battery performance. Considering the remarkable improvement effect according to the formation of the protective layer, it is more preferable that the protective layer is formed to a thickness of 10 nm to 1 μm.

The polymer protective layer may be prepared by applying or spraying the polymer composition, which is a mixture of the ion conductive polymer and a solvent, on the negative electrode current collector, or immersing the negative electrode current collector in the polymer protective layer composition, and then drying it. More specifically, it may be possible to disperse the polymer composition into the solvent to prepare a slurry and then to apply it to the negative electrode current collector.

At this time, it is preferable that the applied solvent has preferably a solubility index similar to the ion conductive polymer 20 and a low boiling point. That is because the mixing can be uniformly made and then the solvent can be easily removed. Specifically, N,N'-dimethylacetamide (DMAc), dimethyl sulfoxide (DMSO), N,N-dimethylformamide (DMF), acetone, tetrahydrofuran, methylene chloride, chloroform, dimethylformamide, N-methyl-2-pyrrolidone (NMP), cyclohexane, water or mixtures thereof can be used as the solvent.

The method of applying the prepared polymer protective layer composition to the negative electrode current collector may be selected from known methods in consideration of the characteristics of the material or may be any new suitable method. For example, it is preferable that the polymer protective layer composition is dispersed on the current collector and then uniformly dispersed using a doctor blade or the like. In some cases, a method of performing distribution and dispersion processes in one process may be also used. In addition, it is possible to use coating methods such as dip coating, gravure coating, slit die coating, spin coating, comma coating, bar coating, reverse roll coating, screen coating, cap coating, and the like. At this time, the negative electrode current collector is the same as described above.

Thereafter, a drying process may be performed for the polymer protective layer formed on the negative electrode current collector, and at this time, the drying process may be carried out by methods such as heat treatment at a temperature of 80 to 120° C. or hot air drying depending on the type of the solvent used in the polymer composition.

In the lithium secondary battery, the remaining components except for the positive electrode and the negative electrode can be prepared through the known techniques that are practiced by those skilled in the art, and will be described in detail below.

The separator according to the present invention is not particularly limited in its material and any separator can be used without any particular limitation as long as it is a separator commonly used as the separator in the electrochemical device, while physically separating the positive electrode and the negative electrode from each other and having a permeability to electrolyte and ions. However, materials that are porous, nonconductive, or insulative, especially those that have low resistance to migration of ions in the electrolyte solution and have good wetting ability due to the electrolyte solution are desirable. For example, a polyolefin-based porous membrane or nonwoven fabric may be used, but it is not particularly limited thereto.

Examples of the polyolefin-based porous film include films formed of any polymer alone selected from polyethylenes such as high density polyethylene, linear low density polyethylene, low density polyethylene and ultra high molecular weight polyethylene, and polyolefin-based polymers such as polypropylene, polybutylene and polypentene or formed of a polymer mixture thereof.

In addition to the above-mentioned polyolefin-based nonwoven fabric, the nonwoven fabric may be a nonwoven fabric formed of, for example, any polymer alone selected from polyphenylene oxide, polyimide, polyamide, polycarbonate, polyethyleneterephthalate, polyethylenenaphthalate, polybutyleneterephthalate, polyphenylenesulfide, polyacetal, polyethersulfone, polyetheretherketone, polyester, and the like, or formed of a polymer mixture thereof. Such nonwoven fabrics include a nonwoven fabric in the form of a fiber to form a porous web, that is, a spunbond or a meltblown nonwoven fabric composed of long fibers.

The thickness of the separator is not particularly limited, but is preferably in the range of 1 to 100 μm, more preferably 5 to 50 μm. When the thickness of the separator is less than 1 μm, the mechanical properties cannot be maintained. When the thickness of the separator exceeds 100 μm, the separator acts as a resistive layer, thereby deteriorating the performance of the battery.

The pore size and porosity of the separator are not particularly limited, but it is preferable that the pore size is 0.1 to 50 μm and the porosity is 10 to 95%. If the separator has a pore size of less than 0.1 μm or a porosity of less than 10%, the separator acts as a resistive layer. If the separator has a pore size of more than 50 μm or a porosity of more than 95%, mechanical properties cannot be maintained.

The electrolyte applicable in the present invention may be a non-aqueous electrolyte solution or a solid electrolyte which does not react with lithium metal, preferably non-aqueous electrolyte, and includes an electrolyte salt and an organic solvent.

The electrolyte salt contained in the non-aqueous electrolyte solution is a lithium salt. As the lithium salt, lithium salts conventionally used in the electrolyte solution for the lithium secondary battery may be used without limitation. The anions of the lithium salts include, for example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ or a combination of two or more thereof.

As the organic solvent contained in the non-aqueous electrolyte solution, the organic solvents commonly used in the electrolyte solution for the lithium secondary battery may be used without limitation, and for example, ethers, esters, amides, linear carbonates, and cyclic carbonates, etc. may be used alone or in combination of two or more thereof. Among them, carbonate compounds which are representatively cyclic carbonates, linear carbonates, or a mixture thereof may be included.

Specific examples of the cyclic carbonate compound include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, and halides thereof, or a mixture of two or more thereof. Examples of these halides include, for example, but are not limited to, fluoroethylene carbonate (FEC) and the like.

In addition, specific examples of the linear carbonate compound include, but not limited thereto, any one selected from the group consisting of dimethyl carbonate (DMC), diethyl carbonate (DEC), dipropyl carbonate, ethyl methyl carbonate (EMC), methyl propyl carbonate and ethyl propyl carbonate or a mixture of two or more thereof.

Especially, among the carbonate-based organic solvents, cyclic carbonates such as ethylene carbonate and propylene carbonate are highly viscous organic solvents having high dielectric constant, so that the lithium salt in the electrolyte can be more easily dissociated. When such cyclic carbonates are mixed with the linear carbonates having a low viscosity and low dielectric constant, such as dimethyl carbonate and diethyl carbonate in an appropriate ratio, an electrolyte solution having a higher electric conductivity can be produced.

In addition, the ethers in the organic solvent may include, but not limited thereto, any one selected from the group consisting of dimethyl ether, diethyl ether, dipropyl ether, methyl ethyl ether, methyl propyl ether, and ethyl propyl ether, or a mixture of two or more thereof.

In addition, the esters in the organic solvent may include, but not limited thereto, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more thereof.

The injection of the non-aqueous electrolyte solution can be performed at an appropriate stage in the preparing process of the electrochemical device depending on the preparing process and the required physical properties of the final product. That is, the injection can be performed before assembling the electrochemical device or at the final stage for assembling the electrochemical device, etc.

The lithium secondary battery according to the present invention can be prepared by a lamination or stacking process and a folding process of the separator and the electrode in addition to a winding process which is a general process. In addition, the case of the battery may be a cylindrical shape, a square shape, a pouch shape, a coin shape or the like.

The lithium secondary battery according to the first embodiment of the present invention can be prepared by forming a positive electrode material mixture as described above on a positive electrode current collector; forming a thin film of lithium on the positive electrode material mixture; sequentially arranging and then laminating a separator and a negative electrode current collector on the thin film of lithium; and injecting electrolyte.

The lithium secondary battery according to the second embodiment of the present invention can be prepared by forming a positive electrode material mixture as described above on a positive electrode current collector; forming a thin film of lithium on the positive electrode material mixture; forming a polymer protective layer on one side of the negative electrode current collector facing a separator; sequentially arranging and then laminating the separator and a negative electrode current collector on the thin film of lithium; and injecting electrolyte.

As described above, the lithium secondary battery including the positive electrode active material according to the present invention stably exhibits excellent discharge capacity, output characteristics, and capacity retention ratio, and therefore is useful for portable devices such as mobile phones, notebook computers and digital cameras, and electric vehicles such as hybrid electric vehicles (HEV).

Thus, according to another embodiment of the present invention, there is provided a battery module including the lithium secondary battery as a unit cell and a battery pack including the same. The battery module or the battery pack may be used as a power source of at least one medium or large-sized devices selected from a power tool; electric vehicles including an electric vehicle (EV), a hybrid electric vehicle, and a plug-in hybrid electric vehicle (PHEV); or a system for power storage.

Hereinafter, in order to explain the present invention in detail, the present invention will be described with reference to examples. However, the examples according to the present invention can be modified into various other forms, and the scope of the present invention should not be construed as being limited to the examples described below. The examples of the present invention are provided to more fully describe the present invention to those skilled in the art.

EXAMPLE 1

Co, CoO, $Co_3O_4$ and $Li_2O$ were mixed in a molar ratio of Co:CoO:$Co_3O_4$:$Li_2O$ of 4:5:1:6 and then the positive electrode active material composition stirred in a planetary ball mill for 2 hours, and Super-P and PVdF in a weight ratio of 92:4:4 were mixed to form a positive electrode material mixture (loading 450 mg/25 cm²). On such a mixture, a lithium metal of a thickness of 20 μm was laminated by a lamination method.

A negative electrode body having a LiPON protective layer with a thickness of 0.2 μm was formed on one side of a copper current collector.

An electrode assembly was prepared by interposing a separator of porous polyethylene between the positive electrode and the negative electrode, and after the electrode assembly was placed inside the case, the lithium secondary battery was prepared by injecting electrolyte. At this time, electrolyte prepared by dissolving 1 M of LiPF6 and 2 wt. % of VC in an organic solvent having a volume ratio of FEC:EC:DEC:DMC of 1:1:2:1 was used.

EXAMPLE 2

A lithium secondary battery was prepared in the same manner as in Example 1 except that the LiPON protective layer as in the negative electrode of Example 1 was not formed.

EXAMPLE 3

A lithium secondary battery was prepared in the same manner as in Example 1 except that instead of forming the LiPON protective layer on one side of the copper current collector as in the negative electrode of Example 1, a protective layer of PVdF-HFP (HFP content of 5 wt. %) having a thickness of 0.3 μm was formed.

COMPARATIVE EXAMPLE 1

A lithium secondary battery was prepared in the same manner as in Example 1 except that instead of the positive electrode active material of Example 1 above, a composition comprising a LCO based positive electrode active material, Super-P and PVdF in a weight ratio of 95:2.5:2.5 is used.

EXPERIMENTAL EXAMPLE 1

The lithium secondary batteries prepared in Example 1 and Comparative Example 1 were subjected to charging and discharging tests under the conditions of charging at 0.2 C, 4.25V CC/CV (5% current cut at 1 C) and discharging at 0.5 C CC 3V. The number of cycles at which 80% of the initial capacity was reached is reported in Table 1 below.

TABLE 1

|  | Number of cycles at which 80% of the initial capacity was reached |
| --- | --- |
| Example 1 | 215 |
| Comparative Example 1 | 130 |

As a result of the test, the life characteristics of the lithium secondary battery of Example 1 were increased by about 1.65 times that of the lithium secondary battery of Comparative Example 1. It can be seen that this result is due to the fact that lithium in the manufacturing process is shielded from being exposed to the atmosphere, thereby inhibiting the formation of the surface oxide film, and due to the effect of the polymer protective layer on the negative electrode current collector.

Therefore, it was confirmed that even though the unit cost of preparation is reduced by applying the positive electrode active material complex combined from Co, CoO, $Co_3O_4$ and $Li_2O$, if the process of forming the thin film of lithium is blocked from oxygen and moisture in the air by the method of forming the thin film of lithium on the positive electrode material mixture and then causing to migrate to the negative electrode current collector at the time of initial charging, life characteristics are improved compared to lithium secondary batteries using positive electrode active material based on conventional lithium cobalt oxide.

EXPERIMENTAL EXAMPLE 2

The lithium secondary batteries prepared in Examples 1 to 3 were charged under the conditions of CC/CV (5% current cut at 1 C) of 0.15 C and 4.25V, and thereafter, were subjected to charging and discharging tests under the conditions of discharging at 0.5 3 V CC and charging at 0.2 C 4.25 V CC/CV (5% current cut at 1 C). The number of cycles at which 80% of the initial capacity was reached is reported in Table 2 below.

TABLE 2

| | Number of cycles at which 80% of the initial capacity was reached |
|---|---|
| Example 1 | 320 |
| Example 2 | 241 |
| Example 3 | 296 |

The test is to demonstrate the effectiveness of the polymer protective layer, and as a result of comparing Example 1 in which a LiPON protective layer was applied, Example 2 in which no polymer protective layer was provided, and Example 3 in which a PVdF-HFP protective layer was applied, it was confirmed that life characteristics of the battery with polymer protective layer is excellent and in particular, the LiPON protective layer further improves the life characteristics as compared with the PVdF-HFP protective layer.

DESCRIPTION OF SYMBOLS 10. positive electrode
11. positive electrode current collector
12. positive electrode material mixture
20. negative electrode
21. negative electrode current collector
22. negative electrode material mixture (thin film of lithium)
30. separator

The invention claimed is:

1. A lithium secondary battery component comprising:
a positive electrode comprising a positive electrode current collector and a positive electrode material mixture;
a negative electrode comprising a negative electrode current collector and a negative electrode material mixture;
a separator interposed therebetween; and
electrolyte,
wherein the positive electrode material mixture comprises a complex combined from Co, CoO, $Co_3O_4$ and $Li_2O$ as a positive electrode material, and the negative electrode material mixture comprises lithium metal that is separated from the negative electrode current collector and positioned between the positive electrode material mixture and the separator wherein a thin film of lithium is formed on one side of the positive electrode material mixture, and
wherein the positive electrode material complex comprises aggregates of fine powders of Co, CoO, $Co_3O_4$, and $Li_2O$, wherein the aggregates have structures having internal voids.

2. The lithium secondary battery component according to claim 1, wherein the positive electrode material contained in the positive electrode material mixture is a complex combined from Co, CoO, $Co_3O_4$, and $Li_2O$ in a molar ratio of 3.8 to 4.2:4.8 to 5.2:0.8 to 1.2:5.8 to 6.2 of Co:CoO:$Co_3O_4$:$Li_2O$.

3. The lithium secondary battery component according to claim 1, wherein the positive electrode material contained in the positive electrode material mixture is a complex combined from Co, CoO, $Co_3O_4$, and $Li_2O$ in a molar ratio of 4:5:1:6 of Co:CoO:$Co_3O_4$:$Li_2O$.

4. The lithium secondary battery component according to claim 1, wherein when the lithium secondary battery component is initially charged at a temperature of 50 to 70° C., the positive electrode material of the complex combined from Co, CoO, $Co_3O_4$, and $Li_2O$ synthesizes $LiCoO_2$ inside the lithium battery component to form a lithium battery.

5. The lithium secondary battery component according to claim 1, wherein when the lithium secondary battery component is initially charged at a current density of 0.01 to 0.5 C, lithium metal formed on the positive electrode material mixture is migrated to the negative electrode current collector in the form of lithium ions to form the negative electrode coated with a thin film of lithium on the negative electrode current collector.

6. The lithium secondary battery component according to claim 1, wherein a polymer protective layer is formed on one side of the negative electrode current collector facing the separator.

7. The lithium secondary battery component according to claim 6, wherein the polymer protective layer is formed of a lithium ion conductive polymer.

8. The lithium secondary battery component according to claim 6, wherein the polymer protective layer is selected from the group consisting of polyethylene oxide (PEO), polyacrylonitrile (PAN), polymethylmethacrylate (PMMA), polyvinylidene fluoride (PVDF), polyvinylidene fluoride-hexafluoropropylene (PVDF-HFP), LiPON, $Li_3N$, $Li_xLa_{1-x}TiO_3(0<x<1)$ and $Li_2S$—GeS—$Ga_2S_3$.

9. A preparation method for a lithium secondary battery component comprising:
forming a positive electrode material mixture on a positive electrode current collector;
forming a thin film of lithium on the positive electrode material mixture;
sequentially arranging and then laminating a separator and a negative electrode current collector on the thin film of lithium; and
injecting electrolyte,
wherein the positive electrode material mixture includes a complex combined from Co, CoO, $Co_3O_4$, and $Li_2O$ as a positive electrode material,
wherein the positive electrode material complex comprises aggregates of fine powders of Co, CoO, $Co_3O_4$, and $Li_2O$, wherein the aggregates have structures having internal voids.

10. The preparation method according to claim 9, wherein the method further comprises forming a polymer protective layer on one side of the negative electrode current collector facing the separator.

11. The lithium secondary battery component according to claim 1, wherein a particle size of the fine powders is from 5 nm to 1000 nm, and a particle size of the aggregates is from 0.1 μm to 30 μm.

* * * * *